(No Model.) 5 Sheets—Sheet 1.

F. J. BECKER.
CORN PLANTER.

No. 541,955. Patented July 2, 1895.

WITNESSES.
E. J. Schroder.
J. E. Hancock

Frank J. Becker INVENTOR.
By Robert S. Carr
his ATTORNEY.

(No Model.) 5 Sheets—Sheet 2.

F. J. BECKER.
CORN PLANTER.

No. 541,955. Patented July 2, 1895.

WITNESSES.
E. J. Schroder.
J. E. Hancock.

Frank J. Becker INVENTOR.
By Robert S. Carr
his ATTORNEY.

F. J. BECKER.
CORN PLANTER.

No. 541,955. Patented July 2, 1895.

(No Model.)  F. J. BECKER.  5 Sheets—Sheet 5.
CORN PLANTER.

No. 541,955.  Patented July 2, 1895.

Fig. 21.

Witnesses:  Frank J. Becker Inventor
By Robert S. Carr
Attorney

UNITED STATES PATENT OFFICE.

FRANK J. BECKER, OF HAMILTON, OHIO, ASSIGNOR TO THE H. P. DEUSCHER COMPANY, OF SAME PLACE.

CORN-PLANTER.

SPECIFICATION forming part of Letters Patent No. 541,955, dated July 2, 1895.

Application filed December 16, 1893. Serial No. 493,818. (No model.)

*To all whom it may concern:*

Be it known that I, FRANK J. BECKER, of Hamilton, Butler county, Ohio, have invented certain new and useful Improvements in Corn-Planters, of which the following is a specification.

My invention relates to that class of double row corn planters, wherein the main frame is coupled to and drawn by the runner frame; and the objects of my improvement are, to couple the frames together with segmental hinges; to adjust the hinges on the main frame to regulate the tension of the drive chain; to support the mechanism for raising or depressing the runner frame on the stay bolt of the main frame; to separately adjust the check valves in the spouts; to open the check valves by either check head without engaging the other check head; to actuate the dropping mechanism from the axle at intervals, alternating with the intermittent action of the check valves by the check wires; to facilitate the removal of the check wire from the check head, and to throw the seeding mechanism out of gear with the axle. These objects are attained in the following described manner, as illustrated in the accompanying drawings, in which—

Figs. 6, 7, and 8, details showing the adjustment of the check-valves; Fig. 9, plan of toggle to actuate the rock-shaft; Fig. 10, a side elevation, and Fig. 11 a plan of the mechanism for raising or depressing the runner-frame; Fig. 12, a detail showing the seat-bow attached to the stay-bolt; Figs. 15, 16, and 17, details of said check-heads.

In the drawings, A represents the runner frame provided with a pole and with hounds B and supported on runners C by hollow shanks or spouts D. Seed boxes E on the runner frame are each provided with dropping mechanism adapted to intermittently deposit the corn in the spouts. Operating shaft F actuates said dropping mechanism by any ordinary means, as bevel gears, which are not part of my invention and are, therefore, not shown. Check heads G on the seed boxes are adapted to independently actuate the rock shaft H to open check valves I that deposit the corn in the ground, and simultaneously to engage the operating shaft with the axle.

The main frame J mounted on ground wheels by revolving axle K is coupled to the runner frame by segmental hinges L. Stay bolt M stiffens said frame and supports sleeve N thereon. Arms O integral with the sleeve are pivotally connected to the hounds by links P. Said sleeve may be rocked on the stay bolt to raise or depress the runner frame by means of foot bar Q attached to its center, or by hand lever R attached to one of its ends. A detent latch on the hand lever engages with segmental rack S on the main frame to lock the runner frame in the desired position. Sprocket wheel T on the operating shaft F is driven from a sprocket wheel K' on the axle by drive chain U and is adapted to intermittingly operate the shaft by suitable clutch mechanism. Legs W on the rear part of the main frame support the driver's seat and are provided with bearings X for the axis of the check wire reel not shown to facilitate the reeling or unreeling of the wire. Seat bow Y secured to the stay bolt braces the legs against the strains incident to the use of the reel thereon.

Segmental hinges L, (Figs. 3, 4 and 5,) each consist of interlocking members 1 and 2, and cap 3. Member 1 is composed of three integral parts: shank 4 provided with oblong slots or bolt holes 5; neck 6 that tapers from the shank and is curved to about the fourth part of a circle and provided with shoulder 7 formed perpendicular to one of its sides, and segmental bar 8 formed across and terminating at the small end of the neck. Said bar is rectangular in cross section and is curved to resemble the segment of a ring of less extent than a semi-circle. Member 2 of said hinges is formed with recess 9 in one of its sides to conform in shape with the curvature of, and serve as a seat for bar 8 of member 1. The wall of the recess 9 is cut away as at 10 to form an opening for the passage of the neck of member 1 said opening being sufficiently wide for the oscillation of said neck therein. The top edge of member 2 adjacent to the gap is parallel in curvature with the top of the recess and forms a seat whereon shoulder 7 is movable to the extent of the oscillation of the neck in the gap, and whereby the shoulder retains the segmental bar in contact with the top of the recess. In this position the members of said hinges are movably interlocked together to be retained by cap 3 being secured to member 2 over the recess.

Figure 1:
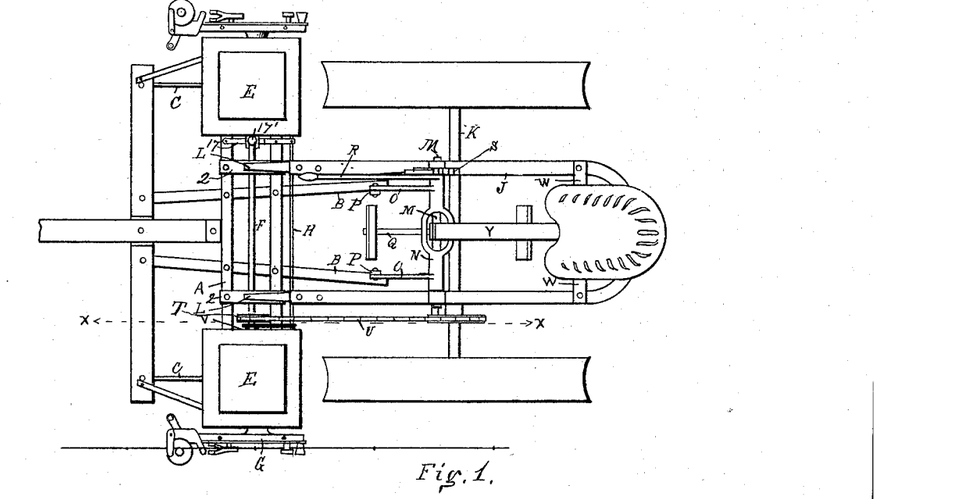
Figure 1 illustrates a plan of the planter.
Figure 2:
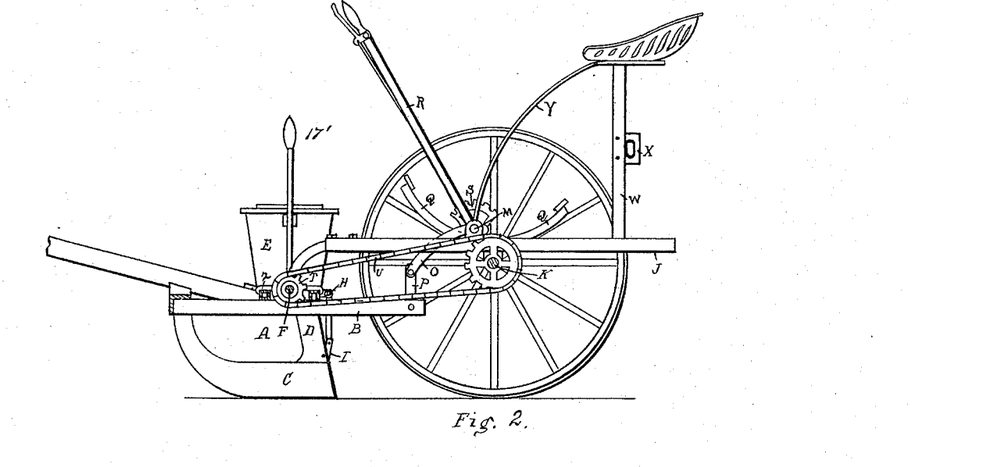
Fig. 2, a vertical section thereof on the line *x x* of Fig. 1.
Figure 3:
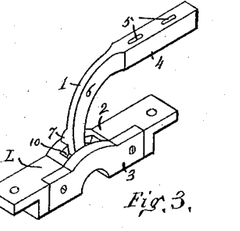
Fig. 3, the hinge couplings for the frames in perspective.
Figure 4:
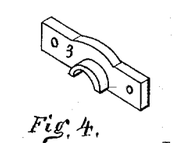
Figs. 4 and 5, perspective details of said hinge-couplings.
Figure 5:
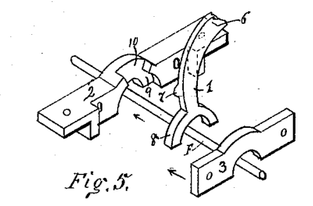

Members 1 of the hinges are adjustably bolted to the side bars J of the main frame, and members 2 are rigidly fastened to the runner frame. In this manner the frames are coupled together and the oscillation of neck 6 in gap 10 of the hinges is sufficient for the necessary movement of the runner frame. By the removal of caps 3 the frames may be disconnected without disturbing other parts of the planter.

While the location of the operating shaft F is not dependent upon the position of the hinges, it is preferably located concentric to their movement to maintain constant the tension of the drive chain during the different positions of the runner frame.

The adjustment of hinges L on the main frame to the extent permitted by slots 5 in the shanks thereof, permits the distance between the operating shaft and the axle to be varied to regulate the tension of the drive chain more closely than is possible by the removal or insertion of one of its links, and compensates for the difference in length of drive chains with the same number of links, or for the lengthening of the chain from wear, and dispenses with the necessity for a chain tightener.

Figures 6, 7, 8, 9, 10, 11, 12:
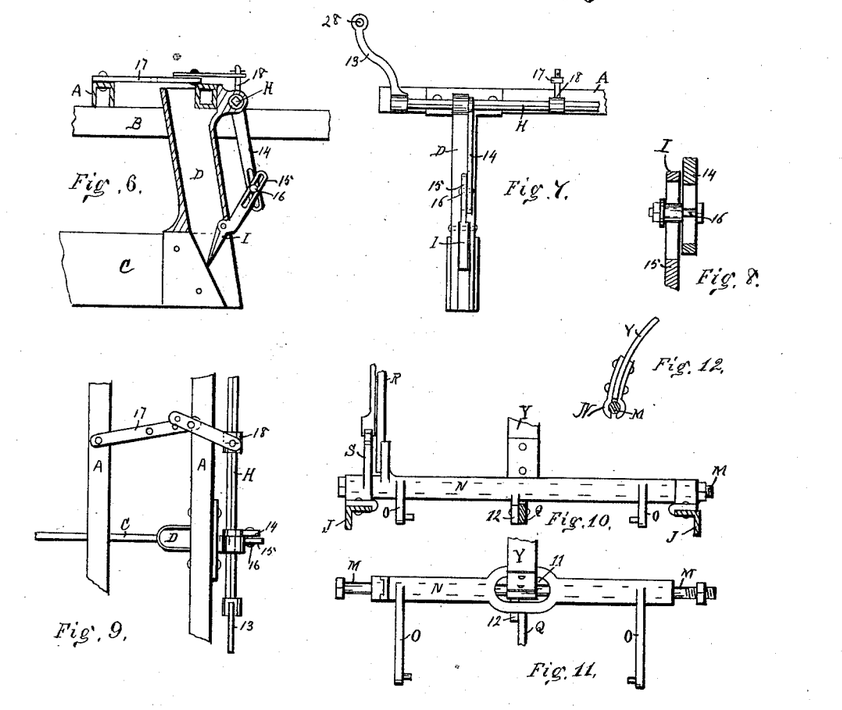

Sleeve N (Figs. 10 and 11) extends in length between the side bars of the main frame, and is formed at its ends to encircle and bear on the stay bolt M. The middle portion of its bore is preferably enlarged or left open underneath to avoid binding on the stay bolt and to cheapen its construction. Opening 11 through the top of the sleeve provides a passage for, and avoids contact of the sleeve with, the seat bow Y that is fastened to the stay bolt, and a lug 12 depends from the middle of the sleeve for the attachment of foot bar Q thereto. In this form of construction the stay bolt M relieves the sleeve N of the strains and friction incident to the attachment of the seat bow Y and of the binding due to the frequent twisting of the main frame.

Rock shaft H is mounted on the rear of the runner frame and provided with crank arms 13 on its respective ends. Slotted arms 14 secured to said rock shaft depend therefrom in the rear of spouts D. Check valves I (Figs. 6, 7 and 8) pivotally secured within the lower portion of said spouts are formed with slotted ends 15 that are extended at a vertical angle across the slotted portion of arms 14. Said check valves are movably engaged with the respective legs by pivots 16 that are adjustably secured, either to the legs and movable in the slots in the heels of the check valves, or to said heels and movable in the slots in said legs. By the independent adjustment of said pivots in the slot of the part to which they are secured, the check valves may be separately adjusted to compensate for a twist in the rock shaft or other fault that might lessen their efficiency. Lever 17 is pivotally engaged at one end to wrist pin 18 on the rock shaft H and at the other end to the runner frame. Its middle portion is jointed and may be reciprocated laterally out of line, by a hand lever 17' fulcrumed on one of the seed boxes, to oscillate the rock shaft sufficiently to open the check valves. By inserting a pin through holes provided therefor in said lever it may be locked in a straight line to keep the check valves open if desired.

Check heads G (Figs. 13 and 14) are adjustably secured to the respective seed boxes by brackets 19, and each consists of frame 20 provided with the usual guiding spool or pulley 21, guard finger 22, rear guide rollers 23 and 24, and forked vibrating lever 25. Tension spring Z connects the vibrating lever 25 below its center of vibration, with the corresponding crank arm 13 on the rock shaft H, to hold the check valves closed and to retain said lever in its normal position. Plunger rod 26 provided with adjustable stop 27 is pivotally secured at one end to the vibrating lever at a point above its center of vibration. The opposite end thereof is extended through, and is freely movable in, hole 28 in the extremity of the corresponding crank arm. The reciprocation of the rod 26 by the vibrating lever 25 drives the stop 27 against the crank arm 13 and turns the rock shaft H to open the check valves I.

Figure 13:
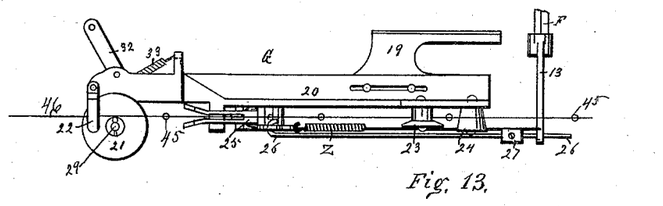
Fig. 13, a plan, and Fig. 14 a side elevation of the check-heads.
Figures 14, 15:
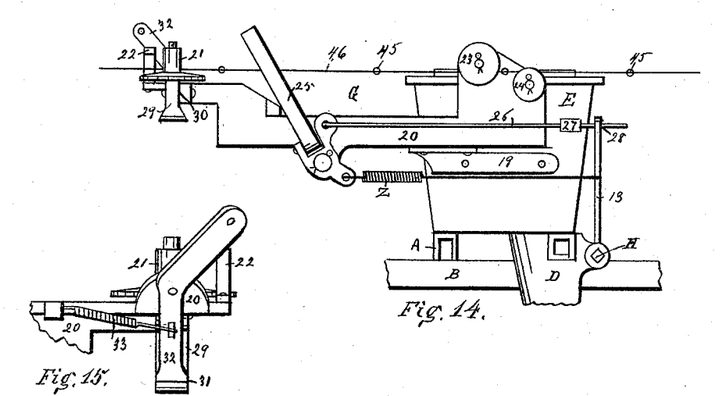
Figure 16:
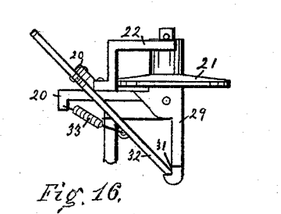
Figure 17:
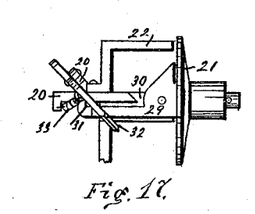

The successive engagement of the knots 45 on the check wire 46 with the vibrating lever 25 of either of the check heads, intermittently opens the check valves, and upon the escapement of the knots therefrom said lever is returned to its normal position, and the check valves are simultaneously closed, by the tension of spring Z. During the engagement of the check wire with either of the check heads the other check head remains inactive and the adjacent crank arm on the rock shaft reciprocates freely on the plunger without becoming engaged therewith.

Standard 29, whereon guiding pulley 21 is journaled, is hinged to frame 20 within gap 30 therein. Said standard depends below the frame and contains notch 31 in its side adjacent to the frame, and wherein latch 32, pivoted on the opposite side of the frame, is engaged by means of spring 33 to lock the standard in a vertical position. By removing the latch from the notch the standard is unlocked and turns outwardly with spool 21 from guard finger 22 to facilitate the removal of the check wire from the check head.

Clutch 34 is in the form of a sleeve and encircles the operating shaft F near one of the seed boxes and near the sprocket wheel T thereon. It is permitted to slide laterally but is prevented from turning on said shaft by means of a feather or key that is secured to the shaft and is movable in a key seat formed in the bore of the clutch. Jaw 35 is formed integral with the front end or face of the clutch 34 and projects therefrom radially. A cavity or recess is formed in the said end of the jaw and is preferably curved concentric to the axis of the clutch. Tooth 36 is pivotally secured within the cavity by a pin that is extended through its middle portion and whereon it is permitted to oscillate to a limited extent and within the cavity. A weak compression spring $t$ is situated under the front end of the tooth and within the cavity to keep the rear end of the tooth seated on the bottom of the cavity. The rear end of the tooth is extended laterally to form a projection without the cavity and beyond the face of the jaw. Said tooth 36 is adapted to engage an arm of the contiguous sprocket wheel T when the clutch is moved sufficiently forward on the shaft F. The pressure of said arm of the sprocket wheel against the end of the tooth lifts it outwardly from the cavity and compresses the spring under its opposite end. By moving the clutch rearwardly on the operating shaft disengages the tooth 36 from the arm of the wheel T, when the expansion of the spring under its front end causes the rear end of the tooth to rebound within the cavity and farther from the wheel T to avoid further contact with the arms thereof until the clutch is again moved toward the wheel. Annular flange 39 is integral with and encircles the rear end of the clutch 34. Catches or cams 38 in the form of ratchet teeth are formed widely apart on the front side of the flange and project toward the front end of the clutch. Spring 37 encircles the operating shaft and forces the clutch forward thereon and into engagement with the sprocket wheel T to actuate the seed dropping mechanism in the seed boxes. Finger 40 is formed at one end to encircle the rock shaft H whereon it is secured by a set screw $h$ and at a point opposite to the clutch on the operating shaft when the clutch is in engagement with the sprocket wheel T. Said finger is extended over and about one-fourth of the distance around the body of the clutch and in contact therewith and terminates at its end in a slanting lateral direction toward and near to the annular flange 39 at a point between the catches 38 thereon. The rotation of the clutch by the sprocket wheel drives the next preceding catch 38 against the slanting side of the finger until the clutch is thereby moved laterally on the operating shaft and becomes disengaged from said wheel and in which position the finger retains the clutch out of action.

Figures 18, 19, 20, 22:
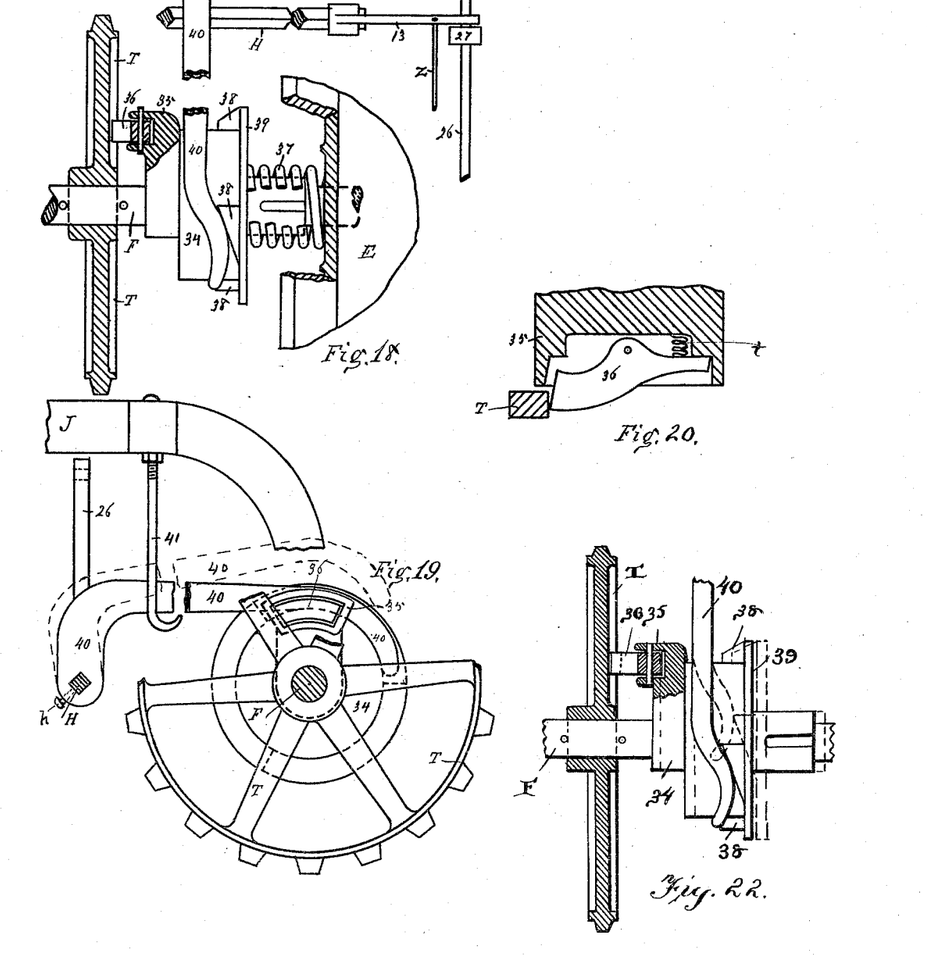
Fig. 18, a plan with parts in section of the clutch on the operating shaft.
Fig. 19, an end elevation of Fig. 18, looking toward the sprocket-wheel.
Fig. 20, a section of the clutch-jaw containing the pivoted tooth.
Fig. 22 is a view similar to Fig. 18, showing the finger and the clutch in two positions by full and dotted lines respectively, whereby the clutch is moved laterally upon the shaft and is also rotated backward a slight distance when the finger is raised.
Figure 21:
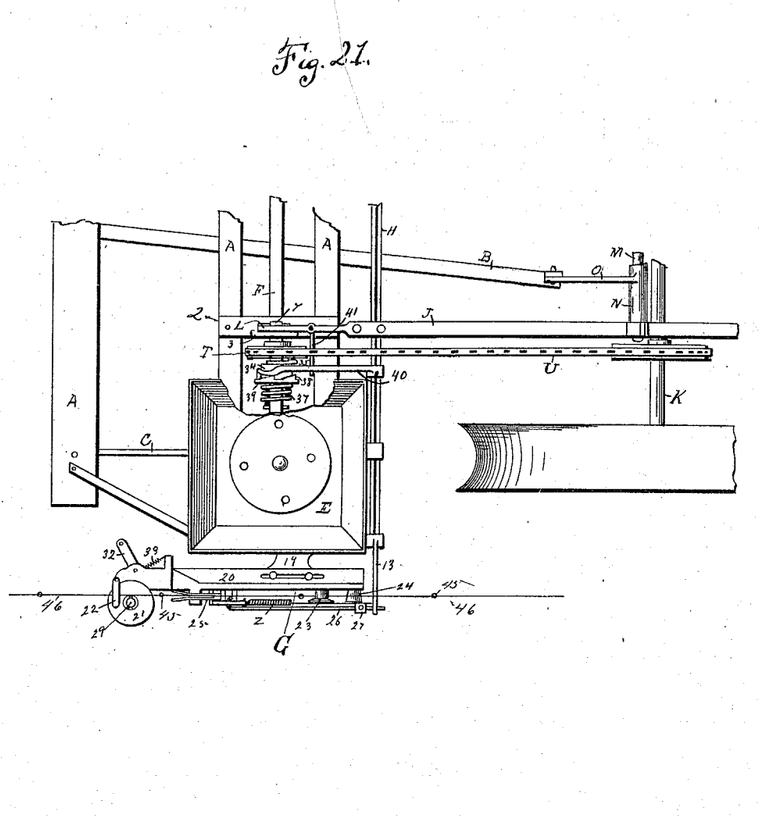
Fig. 21, a plan of a portion of the planter, showing certain details properly assembled.

The momentary action of the rock shaft H is usually effected by the check wire to open the check valves in the spouts D and simultaneously lifts the finger 40 clear of the clutch; and when the rock shaft is actuated by springs Z to close the check valves it also depresses the finger 40 to its normal position on the clutch. The direction of movement of the end of the finger 40 is tangential to the body of the clutch and in being lifted into the position indicated by dotted lines in Fig. 19 the continued contact of catch 38 against its slanting side causes a momentary reversal of the direction of rotation of the clutch and of the seed dropping mechanism in the seed boxes. The momentary reversal of the seed dropping mechanism is very beneficial in effecting a more perfect separation of the corn into the required number of grains for a full hill drop. When finger 40 is raised until it becomes released from catch 38 the clutch is quickly moved forward by spring 37 into re-engagement with the sprocket wheel T. The finger is then returned to its normal position on the clutch to intercept the advancement of the succeeding catch and again disengage the clutch from the sprocket wheel.

The seed dropping mechanism is arranged to act in such relation to the catches 38 on the clutch that a single hill of corn is deposited in the spouts thereby between and immediately preceding the arrival of the successive catches at the point in their rotation where the end of the finger intercepts them and discontinues the action of said mechanism. After each hill of corn is deposited in the seed spouts the seed dropping mechanism is stopped and remains inactive until finger 40 is raised by the action of rock shaft H in opening the check valves to deposit said hill of corn in the ground. After the check valves are closed but a single hill of corn is deposited in the seed spouts until after the valves are again opened and regardless of the distance traversed by the planter between the hills of corn as deposited in the ground by the successive opening of said valves. In this manner the dropping mechanism is actuated by the axle sprocket chain, &c., to deposit the hills of corn in the spouts at intervals with, and immediately succeeding the intermittent action of the check valves by the check wire.

The position of finger 40 may be changed on the rock shaft to prevent its contact with the clutch. The clutch will then remain in engagement with the sprocket wheel and continue the action of the seed dropping mechanism. The check valves may then be opened by the check wire or the hand lever as desired without interfering with the continuous action of the seed dropping mechanism.

Hook 41 adjustably depends from the front end of the side bar of the main frame adjacent to finger 40 on the rock shaft. Said hook is extended laterally under the middle portion of said finger and is adjusted vertically until it will lift the finger from the clutch when the runner frame is depressed into operative position. By thus holding said finger from contact with the clutch the seed dropping mechanism is permitted to remain in continuous action while the runner frame is down; but when the runner frame is raised the hook permits said finger to descend in contact with the clutch and by disengaging it from the sprocket wheel discontinues the action of the seed dropping mechanism.

The seed dropping mechanism in the seed boxes usually consists of circular metal disks rotated through bevel gears not shown driven by the operating shaft. Said disks contain a series of peripheral perforations each adapted to separate and deposit in the seed spouts the desired number of grains of corn for a hill and known as a full hill drop. Said disks are usually removable and may be displaced by others wherein the perforations are each adapted to separate and deposit single grains of corn and known as drilling disks.

In using the drilling disks in the planter to drill instead of to plant the corn in hills they should remain in continuous action. For this purpose finger 40 may be moved on the rock shaft out of range with the clutch, that the clutch may remain in engagement with the sprocket wheel T and continue the action of the disks. The same object however may be effected by moving hook 41 under the finger 40 to hold said finger from the clutch while the runner frame remains depressed. The latter method has the advantage of throwing the seed dropping or drilling-mechanism out of gear when the runner frame is raised from the ground at the termination of each row before turning to begin another.

Having fully described my improvements, what I claim as my invention, and desire to secure by Letters Patent, is—

1. In a planter, the hinge coupling consisting of two integral interlocking members the one of said members containing a curved seat or recess the other of said members being formed with a segment movable in the recess and a cap removably secured to one of said members to retain the other member in engagement therewith.

2. In a planter, the hinge coupling consisting of two integral interlocking members movably secured together by a removable cap, one of said members being formed on one of its sides with a recess, the other of said members terminating in a transverse bar, said bar being segmental in form and movable in said recess.

3. In a planter, the hinge coupling consisting of two integral interlocking members movably secured together by a cap, the one of said members being formed on one of its sides with a recess, and with a gap leading therefrom, the other of said members being formed with a curved neck movable in said gap and terminating in a transverse segmental bar, said bar being movable in said recess.

4. In a planter, the hinge coupling consisting of two interlocking members and means to secure them movably together, the one of said members being formed with a curved recess and with a gap leading therefrom, the top edge of said member adjacent to the gap being parallel in curvature to the top of the recess, the other of said members being formed with a segmental bar across one of its ends, and with a shoulder formed on one of its sides and perpendicular thereto, whereby said segmental bar is held movably against the top of the recess by means of the shoulder being movably seated on said curved edge.

5. In combination, a main frame mounted on ground wheels and an axle, a runner frame mounted on runners and provided with seed dropping mechanism, and segmental hinges wherein the relative movement of the members is limited within an arc of a circle and whereby said frames are movably coupled together.

6. In combination, a main frame mounted on ground wheels and an axle, a runner frame mounted on runners and provided with seed dropping mechanism, and segmental hinges formed with separable members the relative movement of said members being limited within an arc of a circle and whereby said frames are detachably coupled together.

7. In combination, a main frame mounted on ground wheels by a rotative axle, a runner frame mounted on runners and provided with seeding mechanism, segmental hinges limited in movement within an arc of a circle whereby said frames are coupled together, and a rotative operating shaft carried by the runner frame and journaled concentric to the movement of the hinges and driven by the traction of the ground wheels to actuate the seeding mechanism.

8. In combination, a main frame, a runner frame provided with seeding mechanism, segmental hinges formed of separable members that are movable only within a limited arc of a circle whereby said frames are detachably coupled together, and a rotative operating shaft carried by the runner frame and journaled concentric to the hinges, whereby said frames may be disconnected without disturbing the operating shaft.

9. In combination, a main frame mounted on ground wheels by a rotative axle, a runner frame mounted on runners and provided with seeding mechanism, hinges whereby said frames are coupled together, a rotative operating shaft on the runner frame and journaled concentric to the movement of the hinges, said hinges being adjustable on the main frame, whereby the distance between the seed shaft and the axle may be regulated.

10. In combination, a main frame mounted on ground wheels by a rotative axle and provided with a transverse stay bolt spanning the distance between the side bars thereof near to and parallel with the axle, a runner frame hinged to the main frame and provided with hounds, a sleeve supported on the stay bolt and extending between side bars, said sleeve being provided with lever mechanism and with pivotal connections to the hounds, whereby the runner frame may be raised or depressed, and locked in position, and the seat bow secured by one of its ends to the middle portion of the stay bolt and extended therefrom through a gap in the sleeve.

11. The combination with a runner frame and the seed spouts, of a rock shaft, slotted legs depending therefrom and valves pivotally secured within the spouts and movably engaging with the legs.

12. The combination with a runner frame and the seed spouts, of a rock shaft, slotted legs depending therefrom and valves pivotally secured within the spouts, slotted heels formed integral with the valves and extending without the spouts and at a vertical angle across the slotted portion of the legs, and pivots that movably engage the heels with the legs.

13. The combination with the runner frame and the seed spouts, of a rock shaft, slotted legs depending therefrom valves pivotally secured within the spouts and formed with slotted heels, and pivots adjustably secured to the heels and movably engaging with the legs through the slots therein.

14. The combination with a runner frame, the seed spouts, valves therein, and a rock shaft to actuate the valves, of a wrist pin on the rock shaft, and a toggle lever pivotally engaging by its respective ends with the wrist pin and with the runner frame, whereby the rock shaft may be axially oscillated to actuate the valves.

15. The combination, with a runner frame, of seed spouts thereon, valves within the spouts, a rock shaft for actuating the valves, a wrist pin secured to the rock shaft, a toggle lever engaged by its opposite ends with the wrist pin and with the runner frame, and a hand lever to move the middle portion of said toggle lever to rock said shaft, substantially as set forth.

16. The combination, with a runner frame provided with seed spouts and check valves, of a rock shaft for operating the valves, a crank arm on each end of the shaft, a vibrating lever pivotally secured to the frame for each arm, the upper end of which is provided with means for engaging with the check wire, a plunger and a spring secured to the lower end of the lever, above and below the pivotal point thereof, respectively, the free end of the plunger being provided with a stop for engaging with the crank arm and the opposite end of the spring being secured to the crank arm, whereby the crank arm is moved in one direction by the plunger and in the opposite direction by the spring, substantially as set forth.

17. In combination, a check head frame, a vertical standard having its middle portion hinged thereto and having its nether extremity formed with a notch in one side, a latch on the frame and removably held in the notch by a spring, and a guiding spool carried by the upper extremity of the standard, whereby the standard may be locked or unlocked by the latch to cause the guiding spool to retain or discharge the check wire.

18. In a corn planter, the combination, with the seed boxes, of a seed plate in each box, a shaft provided with means for engaging with and operating the seed plate, a clutch upon the shaft, a rock shaft, and means between the two shafts for rotating the first mentioned shaft, and with it the seed plate, backward a short distance, intermediate the rotation of the plates in depositing the seed, substantially as set forth.

19. In a corn planter, the combination, with an operating shaft, of a continuously moving wheel and an intermittingly moving clutch upon the shaft, said wheel and clutch lying in parallel planes adjacent to each other one face of the clutch being recessed, a tooth yieldingly seated within the recess and adapted to project beyond the face of the clutch and being engaged by the wheel, the tooth being adapted to rebound from the wheel when becoming disengaged therefrom.

20. In a corn planter, the combination, with an operating shaft, of a continuously moving wheel and an intermittingly moving clutch upon the shaft, one face of the clutch being recessed, a tooth pivotally secured within the recess, one end of the tooth being inclined, and adapted to be engaged by the wheel, a spring under the opposite end of the tooth, and means for moving the clutch toward and from the wheel.

21. In a corn planter, the combination, with an operating shaft, of a rock shaft, a wheel and a clutch on the operating shaft and a finger on the rock shaft for automatically disconnecting the clutch from the wheel.

22. In a corn planter, the combination, with an operating shaft, of a rock shaft, a continuously moving wheel and a spring actuated clutch upon the operating shaft, the clutch being provided with inclined cams or notches, and a finger upon the rock shaft for engaging with the cams of the clutch and automatically disconnecting the clutch from the wheel.

23. In a corn planter, the combination, with an operating shaft, of a rock shaft, a wheel and a spring actuated clutch upon the operating shaft, the clutch being provided with a tooth for engaging with the wheel, said clutch being also provided with a series of cams, and a finger upon the rock shaft, the end of which is curved and adapted to be moved tangentially to the periphery of the clutch and to engage with the cams thereon and disengage the clutch from the wheel and to move the operating shaft backward.

FRANK J. BECKER.

Witnesses:
ROBERT S. CARR,
JAMES E. HANCOCK.